No. 790,415. Patented May 23, 1905.

UNITED STATES PATENT OFFICE.

OLIVER W. ZANE, OF LOS ANGELES, CALIFORNIA, ASSIGNOR, BY DIRECT AND MESNE ASSIGNMENTS, TO JOHN McLEOD ARMSTRONG, OF LONG BEACH, CALIFORNIA.

AMALGAMATING-PLATE-PLATER AND AMALGAMATING-PLATE-CLEANING COMPOUND.

SPECIFICATION forming part of Letters Patent No. 790,415, dated May 23, 1905.

Application filed February 4, 1904. Serial No. 192,029.

*To all whom it may concern:*

Be it known that I, OLIVER W. ZANE, a citizen of the United States, residing at Los Angeles, in the county of Los Angeles and State of California, have invented a certain Amalgamating-Plate-Plater and Amalgamating-Plate-Cleaning Compound, of which the following is a specification.

This invention relates to means for cleaning amalgamating-plates and removing any impurities—such as copper, zinc, manganese, or grease, or the salts of copper, zinc, or manganese—such as cupric carbonate or verdigris or any other substance or deposit—accumulating upon the amalgamated surfaces of the plates.

The object of the invention is to produce a composition which may be used upon amalgamating-plates for the purpose of preparing the plates to amalgamate the metals in ores that will amalgamate and also to provide a composition which may also be used for cleaning mercury, so that it will amalgamate with gold or native silver, removing from such mercury any impurities, such as copper, zinc, manganese, &c.

In carrying out the invention I use substantially the following proportions of ingredients: a quart of water, dissolving therein three ounces of potassium cyanid and one-tenth of an ounce of silver nitrate. Preferably the potassium cyanid and the silver nitrate are separately dissolved in water and the two solutions combined; but I do not limit myself to either manner of securing the combination of the elements named in the substantial proportions named. The dissolution of the silver nitrate in the potassium cyanid causes the silver to leave the nitrogen and unite with the cyanogen, forming silver cyanid and potassium nitrate, and the use of the proportions named leaves a sufficient excess of potassium cyanid so that both the silver cyanid and the potassium nitrate are soluble therein.

The second step in the process of forming this composition is to take one pound of pulverized Mexican or Spanish soap-bark (the bark of the *Pithecolobium bigeminum*) and dissolve the same in sufficient water to make a thin paste and then evaporate the water to form a thick paste. The evaporation may be effected by any suitable known means—as, for instance, applying heat to the bottom of the receptacle containing the paste. The paste so formed is then admixed with the dissolved silver cyanid and potassium nitrate, the same being in solution in the excess of potassium cyanid and water and the intermingled constituents agitated to thoroughly mix the ingredients and the resultant mixture subjected to evaporation to form a thick paste. The soap-bark and the excess of potassium cyanid form a carrier which retains the silver cyanid and potassium nitrate in solution.

While I have used the pulverized bark of the *Pithecolobium bigeminum*, yet it is probable that the bark of the *Quillia saponaria* or other soap-bark may be employed as a substitute therefor, and I herein use the term "soap-bark" as including any soap-bark having similar properties with the bark of the *Pithecolobium bigeminum*.

When this composition is used for cleaning mercury in mercury-holding receptacles, a quantity of the composition is mixed with the mercury and the same then agitated, a quantity of water having been added to the receptacle.

When the composition is used for cleaning amalgamating-plates, it may be applied by taking a damp cloth and using the composition like soap. The rubbing of the composition upon the copper plates will remove from such plates any impurities upon the amalgamated surface thereof and will deposit or precipitate thereon a coating of metallic silver which readily coacts with the mercury in further amalgamation.

The composition may be used for plating copper plates for use in amalgamating devices. In such use the composition will be applied with a wet cloth, and by rubbing the composition upon the copper plates the surface of the plates is coated or plated with a deposit of metallic silver. Mercury is then applied to the silver-plated surface to form the usual amalgamated surface of the amalgamating-plate.

The composition is also very useful for cleaning or replating silverware, and the deposit may be readily formed in the manner indicated upon any surface which does not contain iron.

What I claim, and desire to secure by Letters Patent of the United States, is—

1. A compound comprising dissolved potassium cyanid and dissolved silver nitrate and dissolved soap-bark.

2. A compound comprising thirty parts of dissolved potassium cyanid and one part of dissolved silver nitrate admixed with a solvent-carrier.

3. An article of manufacture, comprising thirty parts of dissolved potassium cyanid, one part of dissolved silver nitrate and dissolved soap-bark, evaporated to a paste.

In testimony whereof I have signed my name to this specification, in the presence of two subscribing witnesses, at Los Angeles, in the county of Los Angeles and State of California, this 28th day of January, 1904.

OLIVER W. ZANE.

Witnesses:
FREDERICK S. LYON,
F. M. TOWNSEND.